March 15, 1960      C. J. HIRSCH      2,928,186
TRAVEL INSTRUCTION APPARATUS
Filed Sept. 27, 1956
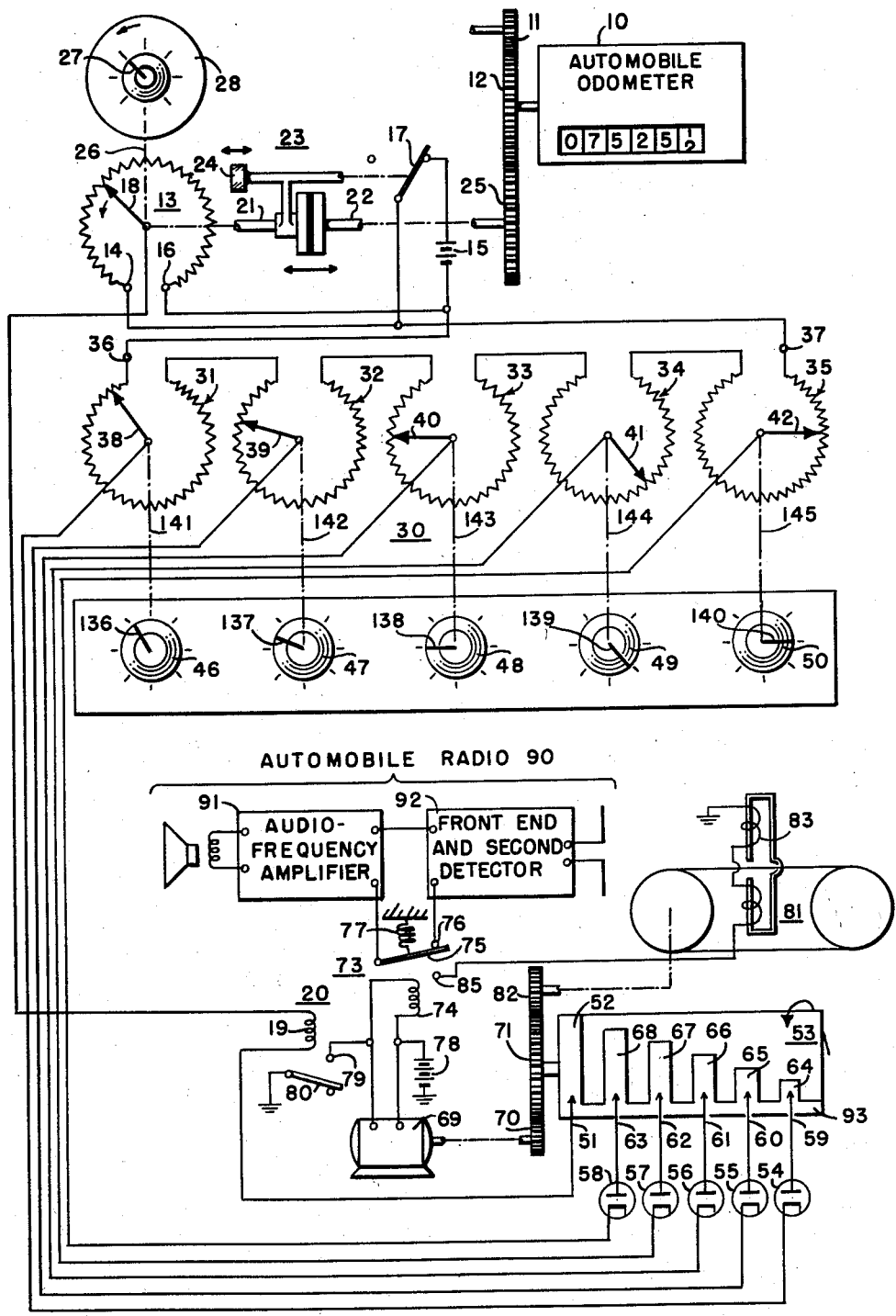

United States Patent Office 2,928,186
Patented Mar. 15, 1960

2,928,186

TRAVEL INSTRUCTION APPARATUS

Charles J. Hirsch, Locust Valley, N.Y., assignor to Hazeltine Research, Inc., Chicago, Ill., a corporation of Illinois Application September 27, 1956, Serial No. 612,556

12 Claims. (Cl. 35—1)

*General*

The present invention is directed to travel instruction apparatus for guiding the operator of a wheeled vehicle such as an automobile along a predetermined route.

The people of the United States are the world's greatest travelers and the principal means for transportation of the American citizen and his family is by automobile. The major oil companies and automobile associations today offer to the traveling public guidance services which include maps that are marked to identify the preferred route between a starting point and a destination. Travel over a strange route, even with such helpful information, usually requires that the driver have the assistance of a competent person for reading, interpreting, and conveying accurate road information to him while he devotes his attention to traffic. With the advent of more powerful automobile engines and fuel, better superhighways and their higher speed limits, and a greater number of cars than has ever been on the roads before, it is becoming necessary for the driver of an automobile traveling over an unfamiliar route to have timely travel instructions in order that he may reach his destination safely and without delay occasioned by tardy or misread information.

It is an object of the invention, therefore, to provide a new and improved travel instruction apparatus for guiding the operator of an automobile along a predetermined route.

It is another object of the invention to provide a new and improved travel instruction apparatus which permits a person to drive an automobile over a strange route without preliminary and subsequent consultation of road maps or without having an assistant in the car to consult such maps in order to supply the driver with travel guidance information.

It is a further object of the invention to provide a new and improved travel instruction apparatus which supplies the driver of an automobile with accurate audible travel guidance instructions.

It is a still further object of the present invention to provide a new and improved travel instruction apparatus which can be used in conjunction with an automobile radio receiver.

It is an additional object of the invention to provide to provide a new and improved travel instruction apparatus which is relatively simple in construction and inexpensive to manufacture.

In accordance with a particular form of the invention, travel instruction apparatus for guiding along a predetermined route the operator of a wheeled vehicle having an odometer driving means comprises means adjustably coupled to the odometer driving means for developing a first voltage having different values each representative of a different position of the vehicle along that route. The travel instruction apparatus also includes a plurality of means each adjustable for providing a different voltage representative of a different position of the first-mentioned means and each having indicia providing an indication representative of a predetermined position of the vehicle along that route. The apparatus further includes means responsive to the aforesaid different values of the first voltage and the aforesaid different voltages for developing at substantially the above-mentioned predetermined positions a signal representative of travel instructions.

For a better understanding of the present invention, together with other and further objects thereof, reference is had to the following description taken in connection with the accompanying drawing, and its scope will be pointed out in the appended claims.

Referring to the drawing, the single figure is a circuit diagram, partly schematic, of a complete travel instruction apparatus embodying the present invention in a particular form.

*Description of travel instruction apparatus*

Referring now to the drawing, it will be assumed that the travel instruction apparatus is mounted in a wheeled vehicle such as an automobile (not shown) having an odometer 10 and the usual driving means therefor represented diagrammatically as a pair of gears 11, 12. The apparatus includes means adjustably coupled to the odometer for developing a first effect or potential having different values, each representative of a different position of the automobile along a predetermined route to be traveled by the automobile. By the term "coupled to the odometer" as employed throughout the claims, one means coupled to the odometer or to the driving means therefor. The means for developing the first effect comprises a voltage divider or potentiometer 13 having one terminal 14 connected through a switch 17 to the positive terminal of a source of substantially constant potential such as a battery 15 while its other terminal 16 is connected to the negative terminal of the battery. The adjustable arm 18 of the potentiometer 13 is electrically connected to the winding 19 of a relay 20 to be described more fully hereinafter. The arm 18 is mechanically coupled through a rotatable shaft 21, represented in part by the dash dot line construction, driven by a shaft 22 adjustably coupled thereto through a clutch 23. A manually operated control 24 is ganged with the switch 17, the latter being adjustable between its closed position, as represented, and an open position. The driving shaft 22 of the clutch is driven through a gear 25 associated with the driving means for the odometer 10. A shaft 26 coupled to the arm 18 of the potentiometer 13 provides unicontrol operation with a pointer 27 associated with a graduated dial 28. During operation, the position of the pointer 27 is representative of the position of the vehicle along the predetermined route since the angular displacement of the pointer and the arm 18 is proportional to the rotation of the odometer driving means.

The travel instruction apparatus also includes a resistive impedance network 30 including a plurality of means in the form of a plurality of series-connected potentiometers 31–35, inclusive, each adjustable to provide a different effect or voltage representative of a different position of the arm 18 of the first potentiometer 13 and each having indicia for providing a visible indication representative of a predetermined position of the automobile along its route. The negative terminal of the battery 15 is connected to an outer terminal 36 of the voltage divider 30 while a terminal of the blade of the switch 17 is connected to the other outer terminal 37 of the divider. It will be seen, therefore, that the network 30 is effectively connected in parallel with the potentiometer 13. The potentiometers 31–35, inclusive, have respective adjustable arms 38–42, inclusive, for providing different voltages representative of the different or successive positions of the adjustable arm 18 of the potentiometer 13. Pointers 136–140, inclusive, are connected in the order named for unicontrol operation by means of respective shafts 141–145, inclusive, with the adjustable arms 38–42, inclusive, of the potentiometers 31–35, inclusive. The pointers just mentioned are superimposed on graduated dials 46–50, inclusive. These pointers taken in connection with their dials afford visible indications which are representative of predetermined or successive positions of the vehicle along its route.

The travel instruction apparatus of the present invention additionally includes means responsive to the different values of the first effect or voltage developed at the adjustable arm 18 of the potentiometer 13 and the different effects or voltages derived by the different arms 38–42, inclusive, of the potentiometers 31–35, inclusive, for developing at substantially the predetermined positions of the vehicle along its route a signal representative of travel instructions. This means includes the relay 20, one terminal of the winding 19 of which is connected to the adjustable arm of the potentiometer 13 as previously mentioned and the other terminal of which is connected to a contact 51 which rests on an annular conductive member 52 on the periphery of a rotatable drum 53. This means for developing a signal representative of travel instructions, in addition to including the drum 53, relay 20, and the members 51 and 52, further includes a plurality of unidirectionally conductive devices or diodes 54–58, inclusive, the cathodes of which are connected, in the order named, to adjustable arms 38–42, inclusive, of the potentiometers 31–35, inclusive. The anodes of these diodes are respectively connected to contacts 59–63, inclusive, that engage, in the order named, conductive fingers 64–68, inclusive, having lengths which increase in the order in which they have been enumerated. A longitudinal conductive band 93 interconnects the annular member 52 with one end of each of the fingers 64–68, inclusive. The means for developing a signal representative of travel instructions additionally includes a motor 69 which is operative to drive the drum 53 through a gear system 70, 71 and further includes a relay 73 having a winding 74 for controlling a movable arm 75 normally held against an upper contact 76 by a spring 77. One terminal of the motor 69 is connected to ground through a battery 78 while the other terminal is adapted to be connected to ground through an upper contact 79 and the movable arm 80 of relay 20. The means for developing a signal representative of travel instructions still further includes a sound recorder such as a tape reproducer 81 of conventional construction which is intermittently responsive to individual control effects developed in a manner to be explained subsequently for producing intermittent audible travel instructions. This tape reproducer is driven by the motor 69 through the gear system 70, 71, and 82 in a conventional manner. The tape reproducer represented diagrammatically in the drawing includes a pickup device 83, one end of which is connected to ground while the other end is connected to a lower contact 85 of the relay 73.

The signal-developing means under consideration preferably includes a radio broadcast receiver which may comprise an automobile radio 90 and this unit includes a conventional audio-frequency amplifier 91 adapted to be connected through the arm 75 and the upper contact 76 of relay 73 to the signal-translating stages preceding the amplifier and comprising the usual front end and second detector 92 of the radio. During normal operation of the radio, the spring 77 biases the arm 75 into engagement with the upper contact 76 of the relay 73 so that the units 91 and 92 are electrically interconnected.

The various dials and pointers described above may be arranged on a suitable panel or panels associated with the dash or instrument panel to the automobile. In addition to pointer 27 and dial 28, five pointers and their dials and five series-connected potentiometers 31–35, inclusive, have been represented in the drawing. However, it will be understood that the travel instruction apparatus of the present invention would ordinarily have a greater number of series-connected potentiometers and indicating means therefor for a purpose to be explained subsequently. For simplicity of representation and explanation, however, only five potentiometers and their associated dials and pointers have been included.

*Explanation of operation of travel instruction apparatus*

Before considering the operation of the apparatus of the present invention, it will be helpful to consider its preliminary adjustment for an imaginary trip from Long Island to Greenfield, Massachusetts. At the outset it will be assumed that the control 24 has been pulled to the left to disengage the clutch 23 and to open the switch 17, thereby disengaging the potentiometer 13 and its associated pointer 27 from the odometer driving means 11, 12 and also disconnecting the potentiometer from the battery 15. This also disconnects resistive network 30 from the battery. It will also be assumed that the driver of the automobile is living on Long Island near the Bronx-Whitestone Bridge and has received from the automobile touring service information recorded on a tape by a driver who previously has traversed the route to Greenfield and has recorded on the tape instructions for guiding the traveler over the route under consideration. The proper tape has now been installed in the tape reproducer 81 of the automobile. Furthermore, the driver has received a card containing information as to the positions at which the pointers 27 and 136–140, inclusive, must be set prior to commencing the trip. It will be apparent that adjustment of the pointers just mentioned effects a corresponding adjustment of the movable arms 18 and 38–42, inclusive, of the various potentiometers. For convenience, let it be assumed that the instruction card states that the pointer 27 should be set at 0, the pointer 136 set at 1, the pointer 137 set at 2½, the pointer 138 set at 31, the pointer 139 set at 42, and the pointer 140 set at 59 at the outset of the journey. Furthermore, it will be assumed that the instruction card states that the control 24 should be operated to engage the clutch 23 and to close the switch 17 when the automobile has passed over the Bronx-Whitestone Bridge and arrived at the toll station at that end of the bridge. Assuming next that the driver has now reached the toll station with his radio turned on and has operated the designated controls, the travel instruction apparatus is now conditioned to perform its function.

As the automobile leaves the toll station, the odometer drive mechanism, through the gear system 11, 12, and 25, the shafts 22 and 21, and the clutch 23, rotates the arm 18 and the pointer 27 counterclockwise as represented. As the arm 18 rotates counterclockwise toward the terminal 14, a more positive potential is developed at the arm for application to the upper terminal of the relay winding 19. At this time it will be helpful to realize that the potential appearing at arm 38 is more negative than that appearing at any one of arms 39, 40, 41, and 42. Expressed somewhat differently, the potentials established at the arms 38–42, inclusive, are more positive in the order of the enumeration just given. This will be apparent by observing that the potentiometers 31–35, inclusive, are connected in series and that the negative terminal of the battery 15 is connected to the terminal 36 of potentiometer 31 while the positive terminal of the battery is connected to the terminal 37 of the potentiometer 35. It should also be realized at this time that the setting of the arm 38 is such that the potential appearing thereat is more positive than that initially appearing on the arm 18 when the clutch 23 is engaged and the switch 17 closed. The arm 18 soon reaches a position at which the potential developed thereat is substantially equal to, that is just becomes slightly greater or more positive than, the potential developed at the arm 38 of the potentiometer 31. Tracing the circuit through the arms just mentioned, it will be seen that the positive terminal of the battery 15 is connected through the switch 17 to the terminal 14 of the potentiometer 13 and that the arm 18 is connected through the relay winding 19 to the contact 51 engaging the conductive member 52 of the drum 53 and the latter is connected through the anode-cathode path of the diode 54 to the arm 38 of potentiometer 31. As previously described, the arm 38 has been adjusted to a selected position on the potentiometer 31, which in turn is connected to the battery 15 through the remaining potentiometers of the series combination 31–35, inclusive. The circuit condition described above renders the diode 54 conductive (diodes 55–58, inclusive, are not conductive at this time because the potentials appearing at arms 39–42, inclusive, and hence at the cathodes of the diodes just mentioned, are more positive than the potential presently appearing at arm 18) and current flows in the relay winding 19 so as to lift the arm 80 of relay 20 into engagement with its upper contact 79. This energizes the motor 69 and, in turn, drives both the drum 53 and the tape reproducer 81. The engagement of the arm 80 with the upper contact 79 also is effective to energize the winding 74 of the relay 73, thereby carrying the arm 75 of the relay 73 against the resistance of spring 77 into engagement with the lower contact 85 of the relay. In this position of the relay, the pickup device 83 of the tape reproducer is connected in circuit with the audio-frequency amplifier 91 and the unit 92 of the automobile radio 90 is effectively disabled or disengaged from the audio-frequency amplifier 91.

At this time, therefore, the tape reproducer 81 will apply to the audio-frequency amplifier 91 an electrical signal which is converted by the loudspeaker of the radio 90 into audible information stating that the car is now on Merritt Parkway or Route 15 and will continue on that Parkway to the outskirts of Hartford, Connecticut. With this information and such additional information as may be advisable but which for simplicity will not be disclosed herein, the driver continues on his parkway trip toward Hartford. During the period the tape reproducer is supplying this information to the automobile radio, the drum 53 is being rotated by the motor 69 for a period sufficient only to deliver this information. The length of the contact finger 64 and the speed of rotation of the drum 53 determine the length of this information, after which the finger 64 is carried beyond the contact 59 and the electrical circuit through the diode 54 is interrupted. This interruption de-energizes the relay winding 19 and the circuit through arm 80 and contact 79 energizing the motor 69 is broken, thus shutting off the motor. At the same time, the relay winding 74 is de-energized and the spring 77 returns the arm 75 to engagement with the upper contact 76 of relay 73, thereby interconnecting units 91 and 92 of the automobile radio 90 so that it is conditioned to develop sound information in its loudspeaker from received broadcast signals.

The driver continues along his way and it will now be assumed that he is arriving near the Charter Oak Bridge in Hartford and is to be supplied with information as to reaching Route 5 which will take him northward to Springfield, Massachusetts. It will now be assumed that the arm 18 has been rotated by the odometer driving mechanism to a position such that there is applied to that arm a voltage substantially equal to, in particular slightly greater than, that appearing on arm 39 of potentiometer 32. At this time, contact 60 is resting near the extremity of the contact finger 65 and a circuit between arms 18 and 39 is completed through the relay winding 19, contact 51, conductive member 93, finger 65, contact 60, diode 55 and the connection from the cathode of the latter to arm 39. In the manner previously explained when the diode 54 was rendered conductive, conduction in diode 55 now serves to operate the motor 69 and drive the drum 53 and the tape reproducer 81 while connecting the latter in circuit with the audio-frequency amplifier. The information supplied by the tape recorder informs the traveler that he should take the left lane in order to pass over Charter Oak Bridge and that within 200 yards from the toll station at the far end of the bridge it will be necessary to make an abrupt right turn at the marked intersection in order to get on Route 5 which will take him through East Hartford and put him on the direct road to Springfield. Information will also be supplied stating that at the first stop sign after the toll booth it is desirable to recalibrate the apparatus to compensate for inaccuracies due to variations in tire pressure, roughness of the road, detours, stopping off the road for lunch, etc., which might make a difference in the reading of the distance traveled. The operator is instructed that at this stop sign or at a point in its immediate vicinity he should pull the control 24 so as to disengage the clutch 23 and the switch 17. This will enable him to set the pointer 27 at a predetermined position such as at the number 38 on the dial 28 to effect the calibration. The driver is then instructed to push the control 24 so as to engage the clutch 23 and close the switch 17, thereby conditioning the apparatus for further operation. However, if the pointer reaches the predetermined position just mentioned at the designated stop sign, it will be unnecessary to make the calibration adjustment just mentioned. After this information has been repeated a suitable number of times so that the driver clearly understands it, the drum has rotated sufficiently so that the contact 60 no longer engages the contact finger 65, thereby interrupting the circuit, shutting off the motor 69 and the tape recorder, and disconnecting the recorder from the audio-frequency amplifier 91 while connecting the latter to the front end 92 of the automobile radio 90. The driver at this time is proceeding along his way and eventually is approaching the outskirts of Springfield. During this time, the arm 18 of the potentiometer 13 continues to be rotated counterclockwise and develops a more positive voltage at the arm as the automobile makes its way toward Springfield.

At the outskirts of Springfield, the voltage appearing at the arm 18 slightly exceeds that appearing at the preset arm 40 and the diode 56 now becomes conductive, thereby starting the motor 69 which, once again, drives the drum 53 and the tape reproducer 81. The latter is now connected to the amplifier 91 of the radio 90 and the driver is informed that by continuing straight ahead the road will carry him through a portion of the industrial area of Springfield for several miles, whereupon he will turn directly to the right at a traffic light near a stone bridge, proceed over the bridge, and enter upon a parkway which parallels the west bank of the Connecticut River and carries him without confusion toward Holyoke. After the information mentioned above has been disseminated, the drum has reached a position wherein the contact 61 no longer makes engagement with the contact finger 66 and the circuit through the diode 56, the motor 69, and the relays 20 and 73 is interrupted, thereby stopping the motor, the drum, and the tape reproducer and reconnecting the two portions of the car radio.

Just prior to reaching Holyoke the arm 18 has reached a position where the voltage appearing thereat is slightly more positive than that appearing at the pre-adjusted arm 41 of the potentiometer 34, thus rendering the diode 57 conductive commencing the cycle of operation of the drum 53 and the tape reproducer 81. The relay 73 is again energized so as to couple the tape reproducer to the audio-frequency amplifier 91. An electrical signal is applied to the loudspeaker of the automobile radio 90 stating that the automobile is traveling north along a relatively straight road portions of which parallel the Connecticut river which flows to the right. The six-lane road has a speed limit which varies between 40 and 45 miles an hour and will shortly pass along the side of the Brightwater Orphanage comprising several stone buildings prominently situated on the side of the hill to the left of the road. Soon thereafter the car will come to an intersection controlled by a traffic light and at this time the driver should turn left when the light permits and pass under an underpass and then swing up a short hill. The driver will be instructed that at the next traffic light, which appears at a street intersection in front of a beautiful round brick church of modern architecture, it may be desirable to calibrate the apparatus again by disengaging the clutch 23 in the manner mentioned above and setting the pointer 27 over the number 56 on the dial 28. Thereafter, the control 24 is operated to engage the clutch and the apparatus continues its operation. The road continues through the outskirts of Holyoke and proceeds almost due north along the bank of the Connecticut river until the city of Northampton is reached. The road has now swung away from the river and continues directly through the city almost due north and through a farming region in Pioneer Valley. After this information has been given, the drum is rotated to a position where contact 62 ceases to engage finger 67 and the circuit through the diode 57, the motor 69, and the relay windings 19 and 74 is interrupted.

The driver continues on his way while listening to the broadcast reception on his automobile radio. Just prior to reaching Greenfield and at about the time the car is passing to the left of the settlement of Old Deerfield, which is so marked by suitable road signs, the voltage developed by the arm 18 of the potentiometer 13 is compared with that appearing at the preset position of arm 42 of potentiometer 35. When these voltages are substantially equal, the circuit between the arms 18 and 42 through the relay winding 19 and the contacts 51 and 63 is completed so that the diode 58 is rendered conductive. The circuit for the motor 69 is completed, thereby turning the drum 53 and starting the tape reproducer 81 while connecting the latter to the contact 75 of relay 73 and to the amplifier 91. The driver is informed of the position of the car just mentioned along the route and is also informed that the road proceeds straight ahead for about 2 miles until it arrives near a high steel railroad bridge which spans a stream flowing to the right. At this time an intersection will be reached and the driver swings left and proceeds along Deerfield Street for about a mile until an underpass is reached. At this time the road swings right under the underpass and proceeds up a moderately steep hill to Main Street which is the business section of Greenfield. At this time the driver will have reached his objective. After this information has been suitably delivered, the contact 63 leaves the finger 68 of the drum 53 and the motor and relay circuits are interrupted, thereby stopping the rotation of the tape reproducer and disconnecting it from the amplifier 91 while connecting the latter in circuit with the front end 92 of the automobile radio. Having received the benefit of this information, the driver soon finds himself at his destination in the heart of the town of Greenfield.

It will be realized that for the purpose of explaining the trip mentioned above, only a small amount of travel information has been given simply to keep the explanation of the operation relatively brief and clear. However, in a practical embodiment of the instruction apparatus, there would be numerous preset potentiometers and indicia therefor in order that more complete information could be given to the driver at various intervals in which such information would be needed.

From the foregoing description and explanation of the operation it will be seen that the travel instruction apparatus in accordance with the present invention is relatively simple in construction and easy to operate. It will also be clear that it very conveniently makes use of the automobile radio existing in most such vehicles for converting information appearing on the tape of a recorder to audible information which is reproduced by the car radio. It will further be clear that, in addition to travel instruction information, the apparatus can be employed to supply scenic, dining, and other information which is welcomed by the traveler.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Travel instruction apparatus of guiding along a predetermined route the operator of a wheeled vehicle having an odometer driving means comprising: means adjustably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; and means responsive to said different values of said first voltage and said different voltages for developing at substantially said predetermined positions a signal representative of travel instructions.

2. Travel instruction apparatus for guiding along a predetermined route the operator of a wheeled vehicle having an odometer driving means comprising: voltage-divider means adjustably coupled to the odometer driving means for developing a first voltage having different values each representative of a different position of the vehicle along that route; a resistor means including a plurality of means each adjustable for providing a different voltage representative of a different position of said first-mentioned means and each having indicia providing an indication representative of a predetermined position of the vehicle along that route; and means responsive to said different values of said first voltage and said different voltages for developing at substantially said predetermined positions a signal representative of travel instructions.

3. Travel instruction apparatus for guiding along a predetermined route the operator of a wheeled vehicle having an odometer driving means comprising: a source of substantially constant voltage; voltage-divider means adjustably connected to said source and having an adjustable tap coupled to the odometer driving means for developing a first voltage having different values each representative of a different position of the vehicle along that route; resistor means connected to said source and including a plurality of taps each adjustable for providing a different voltage representative of a different position of said first-mentioned means and each having indicia providing an indication representative of a predetermined position of the vehicle along that route; and means connected to said taps and responsive to said different values of said first voltage and said different voltages for developing at substantially said predetermined positions a signal representative of travel instructions.

4. Travel instruction apparatus for guiding along a predetermined route the operator of a wheeled vehicle having an odometer driving means comprising: means adjustably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; and means including a voltage-comparison system responsive when said different values of said first voltage are substantially equal to said different voltages for developing at substantially said predetermined positions a signal representative of travel instructions.

5. Travel instruction apparatus for guiding along a predetermined route the operator of a wheeled vehicle having an odometer driving means comprising: means adjustably and detachably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; and means responsive to said different values of said first voltage and said different voltages for developing at substantially said predetermined positions a signal representative of audible travel instructions.

6. Travel instruction apparatus for guiding along a predetermined route the operator of a wheeled vehicle having an odometer driving means comprising: means adjustably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; means responsive to said different values of said first voltage and said different voltages for developing individual control voltages at substantially said predetermined positions; and means responsive to said control voltages for producing intermittent travel instructions.

7. Travel instruction apparatus for guiding along a predetermined route the operator of a wheeled vehicle having an odometer driving means comprising: means adjustably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; means responsive to said different values of said first voltage and said different voltages for developing individual control voltages at substantially said predetermined positions; and means including a tape reproducer intermittently responsive to said control voltages for producing intermittent audible travel instructions.

8. Travel instruction apparatus for guiding along a predetermined route the operator of a wheeled vehicle having an odometer driving means comprising: means adjustably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; means responsive to said different values of said first voltage and said different voltages for developing individual control voltages at substantially said predetermined positions; a radio broadcast receiver for the vehicle; and a tape reproducer coupled to said receiver and intermittently responsive to said control voltages for producing intermittent audible travel instructions.

9. Travel instruction apparatus for guiding along a predetermined route the operator of a wheeled vehicle having an odometer driving means comprising: means adjustably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; and means including a system for comparing voltages responsive to said different values of said first voltage and said different voltages for developing at substantially said predetermined positions a signal representative of travel instructions.

10. Travel instruction apparatus for guiding along a predetermined route the operator of a wheeled vehicle having an odometer driving means comprising: means adjustably coupled to the odometer driving means for developing a first voltage having different values each representative of a different position of the vehicle along that route; a plurality of means each adjustable for providing a different voltage representative of a different position of said first-mentioned means and each having indicia providing an indication representative of a predetermined position of the vehicle along that route; means responsive to said different values of said first voltage and said different voltages for developing individual control voltages at substantially said predetermined positions; a radio broadcast receiver for the vehicle having an audio-frequency amplifier and signal-translating stages preceding said amplifier; and a sound reproducer intermittently responsive to said control voltages for effectively disabling said stages and simultaneously applying to said amplifier intermittent travel instructions.

11. Travel instruction apparatus for guiding along a predetermined route the operator of a wheeled vehicle having an odometer driving means comprising: voltage-divider means adjustably coupled to the odometer driving means for developing a first voltage having different values each representative of a different position of the vehicle along that route; a voltage divider including a plurality of means each adjustable for providing a different voltage representative of a different position of said first-mentioned means and each having indicia providing an indication representative of a predetermined position of the vehicle along that route; means responsive to said different values of said first voltage and said different voltages for developing individual control effects at substantially said predetermined positions; a radio broadcast receiver for the vehicle having an audio-frequency amplifier and signal-translating stages preceding said amplifier and normally coupled thereto; and a sound reproducer intermittently responsive to said control effects for simultaneously disconnecting said stages from said amplifier and applying to said amplifier intermittent travel instructions.

12. Travel instruction apparatus for guiding along a predetermined route the operator of a wheeled vehicle having an odometer driving means comprising: means for developing a first voltage having different values each representative of a different position of the vehicle along that route; means including indicia coupled to said developing means for indicating said values of said voltage and including connecting means detachably coupling said developing means to the odometer driving means to permit calibrating adjustment of said developing means independently of the odometer driving means; a plurality of means each adjustable for providing a different voltage representative of a different position of said first-mentioned means and each having indicia providing an indication representative of a predetermined position of the vehicle along that route; and means responsive to said different values of said first voltage and said different voltages for developing at substantially said predetermined positions a signal representative of travel instructions.

References Cited in the file of this patent

UNITED STATES PATENTS

| | | |
|---|---|---|
| 1,564,583 | Koudriazeff et al. | Dec. 8, 1925 |
| 2,501,048 | Haller | Mar. 21, 1950 |
| 2,730,815 | Gallo | Jan. 17, 1956 |
| 2,799,731 | Straub | July 16, 1957 |
| 2,837,606 | Barthe | June 3, 1958 |